United States Patent [19]
Lavarini

[11] 3,748,505
[45] July 24, 1973

[54] MHD GENERATOR WITH LASER AUGMENTATION

[75] Inventor: Bernard Lavarini, Paris, France

[73] Assignee: Compagnie Generale D'Electricite, Paris, France

[22] Filed: Sept. 18, 1972

[21] Appl. No.: 289,919

[30] Foreign Application Priority Data
Sept. 17, 1971   France .................................. 7133616

[52] U.S. Cl. .............................. 310/11, 331/94.5 G
[51] Int. Cl. ........................................... H02k 45/00
[58] Field of Search ................... 310/11; 331/94.5 G

[56] References Cited
UNITED STATES PATENTS
3,480,806   11/1969   Berberich ............................. 310/11
3,621,461   11/1971   Cason et al. ..................... 331/94.5 G
3,702,973   11/1972   Daugherty et al. ................ 310/11 X Primary Examiner—D. F. Duggan
Attorney—Richard C. Sughrue, Donald E. Zinn et al.

[57] ABSTRACT

An electric generator comprising a compressed and excited gas supply flowing at high speed in an optical resonating cavity to form a laser, the gas then passing between two electrodes. A magnetic field is applied between these two electrodes, and the laser beam is focused in the interelectrode space to increase the electronic density of the gas. A high potential is thus produced between the electrodes.

1 Claim, 1 Drawing Figure

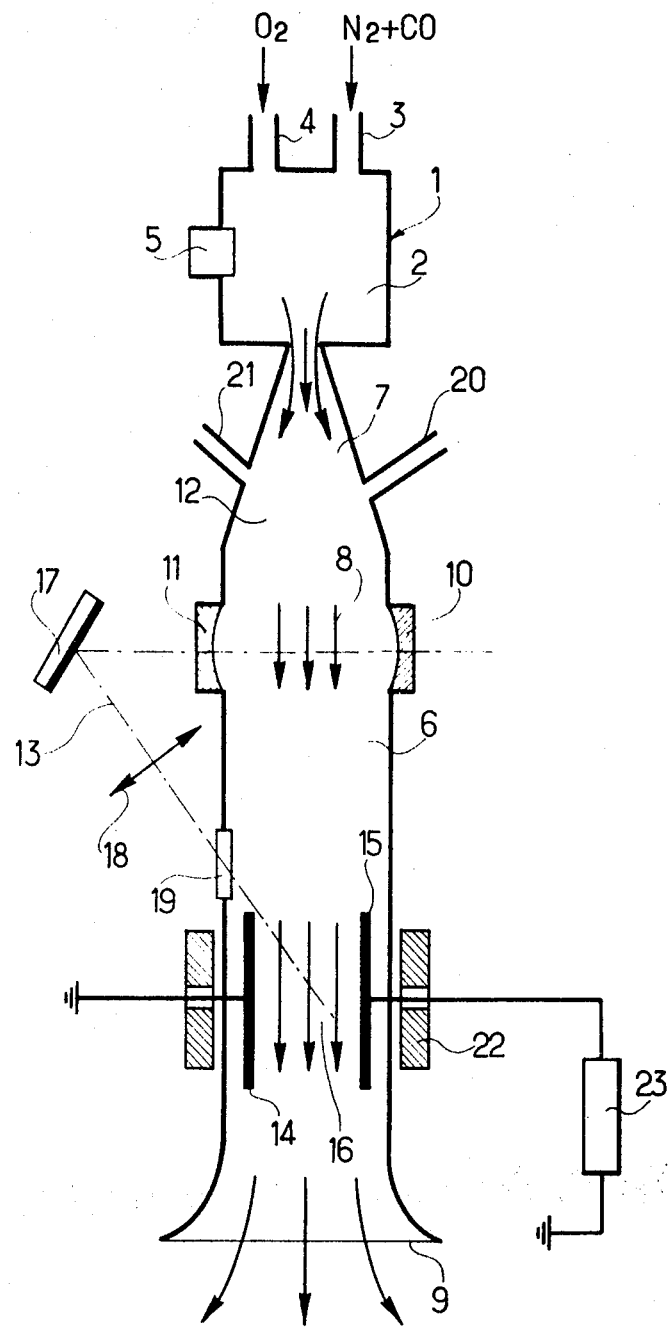

MHD GENERATOR WITH LASER AUGMENTATION

BACKGROUND OF THE INVENTION

1. Field of the Invention

The present invention concerns generators capable of supplying electric power, and more particularly those capable of supplying very high power.

2. Description of the Prior Art

It is known that a difference in potentials at the terminals of two electrodes is obtained when a plasma in movement subjected to a magnetic field passes between the electrodes.

It is also known that it is possible to obtain a plasma having a great electronic density by focusing a high energy laser beam in a medium which is, for example, gaseous.

SUMMARY OF THE INVENTION

The aim of the present invention is to produce an electric generator applying the physical phenomena described above, having a compact form and capable of supplying, without great difficulty, very high electric power.

The present invention has for its object an electric generator characterized in that it comprises:

A source of compressed and energized gas;

A duct arranged at the output of that said source for enabling a high speed gaseous flow to be obtained by expansion of the compressed and energized gas;

An optical resonating cavity arranged at the output of the duct so that the gaseous flow moves through the cavity, to obtain a laser beam;

At least two electrodes defining an inter-electrode space, arranged with respect to the gaseous flow after its passing through the cavity, so that said gas passes through the inter-electrode space;

Means for applying a magnetic field in the inter-electrode space, and,

Means for focusing, in the inter-electrode space, the laser beam which has originated in the optical cavity.

BRIEF DESCRIPTION OF THE DRAWING

Other characteristics and advantages of the present invention will become apparent from the following description, given with reference to the accompanying drawing by way of illustration but having no limiting character, in which the single FIGURE shows an operating diagram of the electrical generator according to the invention.

DESCRIPTION OF THE PREFERRED EMBODIMENT

The generator shown in the FIGURE comprises a source of compressed and energized gas 1, consisting, for example, of a combustion chamber 2 comprising two gas supply pipes 3 and 4 which may be connected respectively, for example, to very high pressure cylinders (not shown in the FIGURE), containing, for example, nitrogen mixed with carbon monoxide and oxygen. An ignition device 5 is connected with the chamber 2 to set off the reaction between the three gases which are brought into that chamber 2 to give rise to a high pressure gas mixture consisting of a mixture of energized particles. That mixture of energized gas contained in the chamber 2 is expanded by means of a duct 7 connected to the output of the chamber 2 to produce a flow of energized gas moving at very high speed in an expansion chamber 6 and to be subsequently evacuated into the atmosphere by the output 9 of the expansion chamber 6.

The wall of the chamber 6 may act as a support for two mirrors 10 and 11 of an optical resonating cavity of the PEROT-FABRY type, one of which, for example the mirror 11, as shown in the FIGURE, may be semi-transparent. That cavity is arranged at the output 12 of the duct 7 so that the energized gas which is ejected passes through the resonating cavity limited by the two mirrors 10 and 11 thus forming a laser producing a laser beam 13 which may emerge from the cavity through the semi-transparent mirror 11. The wall of the chamber 6 may also act as a support for two electrodes 14 and 15, defining an inter-electrode space 16. These electrodes are arranged so that the gas flow, after having passed through the resonating cavity, sweeps through the inter-electrode space 16.

The electric generator comprises, moreover, means for focusing the laser beam emerging from the cavity, in the inter-electrode space 16, these means possibly consisting, as shown in the FIGURE, of a reflecting mirror 17, a converging lens 18 and a transparent window 19 formed in the wall of the expansion chamber 6.

Possibly, as shown in the FIGURE, the electric generator may comprise supply means 20 and 21 through which additional gases such as $CO_2$, $N_2O$ and helium may be supplied to obtain a laser effect in the cavity with maximum efficiency.

The generator also comprises means for obtaining a magnetic field whose directions are perpendicular to the direction of propagation of the gaseous flow 8 and parallel to the plane of the electrodes 14 and 15. These means for obtaining that magnetic field are diagrammatically illustrated in the FIGURE by a magnetic coil 22 arranged in the vicinity of the electrodes 14 and 15.

The FIGURE shows the electrode 14 connected to ground, and the other electrode 15, connected to ground through a circuit 23 which enables the use of the electric current which is set up at the terminals of these two electrodes when the electric generator is operating.

The operation of that generator is as follows:

The combustion chamber 2 is filled with the gases necessary for producing a reaction and forming a mixture of energized gas at high pressure; that reaction is obtained by means of the ignition device 5. The energized gas at high pressure obtained in the chamber 2 is ejected at very high speed into the chamber 6 by means of the duct 7; when that energized gas passed in the cavity limited by the two mirrors 10 and 11, it produces a laser beam which may emerge from the cavity through the mirror 11 and then subsequently be focused in the inter-electrode space 16. The beam focused in the inter-electrode space 16 makes it possible to obtain, with the gas which has passed through the chamber 6, a plasma having a very high electronic density which, subjected to the magnetic field, makes it possible to obtain, at the terminals of the electrodes 14 and 15, a very high potential difference. Then the gas is ejected from the chamber 6 through the output 9 into the atmosphere. The electric power available at the terminals of these two electrodes will be a function of the ejection speed of the gases in the chamber 6, of the value of the magnetic field applied to the plasma set up by the beam 13, of the electronic density of that plasma, as well as of the inter-electrode distance.

It must be understood that the invention is in no way limited to the embodiment described and illustrated, which has been given only by way of example. More particularly, without going beyond the scope of the invention, certain arrangements may be changed or certains means may be replaced by equivalent means.

I claim:

1. Electric generator characterized in that it comprises:
   a. a source of compressed and energized gas;
   b. a duct means arranged at the output of said source for producing a high speed gaseous flow to be obtained by expansion of said compressed and energized gas;
   c. an optical resonating cavity means arranged at the output of said duct means such that the gaseous flow passing through said cavity produces a laser beam;
   d. at least two electrode means defining an inter-electrode space for the gaseous flow after passing through said cavity, wherein said gas passes through said inter-electrode space;
   e. means for applying a magnetic field to the inter-electrode space; and
   f. means for focusing, in the inter-electrode space, said laser beam produced in said optical cavity, whereby a high potential is obtained between said electrodes due to the increased electronic density in said gas caused by the focusing of the laser beam, and the application of the magnetic field.

* * * * *